United States Patent
Fontvieille et al.

(10) Patent No.: US 9,303,573 B2
(45) Date of Patent: Apr. 5, 2016

(54) SYSTEM AND METHOD FOR CONTROLLING AN INTERNAL COMBUSTION ENGINE FOR A MOTOR VEHICLE IN TRANSIT

(75) Inventors: Laurent Fontvieille, Gif-sur-Yvette (FR); Yohann Petillon, Montigny le Bretonneux (FR); Philippe Moulin, Paris (FR); Olivier Grondin, Bougival (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 468 days.

(21) Appl. No.: 13/996,926

(22) PCT Filed: Dec. 20, 2011

(86) PCT No.: PCT/FR2011/053079
§ 371 (c)(1),
(2), (4) Date: Jun. 21, 2013

(87) PCT Pub. No.: WO2012/085443
PCT Pub. Date: Jun. 28, 2012

(65) Prior Publication Data
US 2013/0289852 A1    Oct. 31, 2013

(30) Foreign Application Priority Data
Dec. 22, 2010   (FR) ..................... 10 61071

(51) Int. Cl.
*F02M 41/00*    (2006.01)
*F02D 41/00*    (2006.01)
(Continued)

(52) U.S. Cl.
CPC ........ *F02D 41/0007* (2013.01); *F02D 41/0002* (2013.01); *F02D 41/1458* (2013.01);
(Continued)

(58) Field of Classification Search
CPC .............. F02D 41/144; F02D 41/0072; F02D 41/1458; F02M 25/071; F02M 25/0754; F02M 25/0755; F02M 25/0757
USPC ..................... 123/568.11, 698, 704
See application file for complete search history.

(56) References Cited

U.S. PATENT DOCUMENTS

| 6,176,227 B1 * | 1/2001 | Ohuchi ............... F02D 41/0042 |
| | | 123/295 |
| 7,047,741 B2 * | 5/2006 | Gray, Jr. .................. F01N 3/035 |
| | | 123/301 |

(Continued)

FOREIGN PATENT DOCUMENTS

| FR | 2 866 392 | 8/2005 |
| FR | 2 919 024 | 1/2009 |

OTHER PUBLICATIONS

French Search Report Issued Aug. 2, 2011 in Application No. FR 1061071 Filed Dec. 22, 2010.

(Continued)

*Primary Examiner* — Thomas Moulis
(74) *Attorney, Agent, or Firm* — Oblon, McClelland, Maier & Neustadt, L.L.P.

(57) ABSTRACT

A system for controlling a diesel internal combustion engine including a circuit for partially recirculating exhaust gases, including a mechanism estimating set values of intake-air parameters; a mechanism estimating richness of the exhaust gas; a mechanism determining a set value of the intake richness according to set values of the intake-air parameters; and a mechanism correcting at least one of the set values of the intake-air parameters according to the estimation of the richness of the exhaust gas and the richness set value.

12 Claims, 1 Drawing Sheet

(51) Int. Cl.
*F02D 41/14* (2006.01)
*F02B 3/06* (2006.01)
*F02M 25/07* (2006.01)

(52) U.S. Cl.
CPC .............. *F02B 3/06* (2013.01); *F02D 41/0065* (2013.01); *F02D 41/0072* (2013.01); *F02D 41/144* (2013.01); *F02D 41/1454* (2013.01); *F02D 2041/0017* (2013.01); *F02D 2200/0402* (2013.01); *F02D 2200/0414* (2013.01); *F02D 2200/703* (2013.01); *F02M 25/0707* (2013.01); *F02M 25/0709* (2013.01); *Y02T 10/42* (2013.01)

(56) References Cited

U.S. PATENT DOCUMENTS

| | | | |
|---|---|---|---|
| 7,261,098 B2 * | 8/2007 | Vigild | F02D 41/0052 123/568.21 |
| 7,555,895 B2 * | 7/2009 | Shirakawa | F01N 3/0842 60/274 |
| 2006/0248878 A1 | 11/2006 | Tonetti et al. | |

OTHER PUBLICATIONS

International Search Report Issued Mar. 14, 2012 in PCT/FR11/53079 Filed Dec. 20, 2011.

* cited by examiner

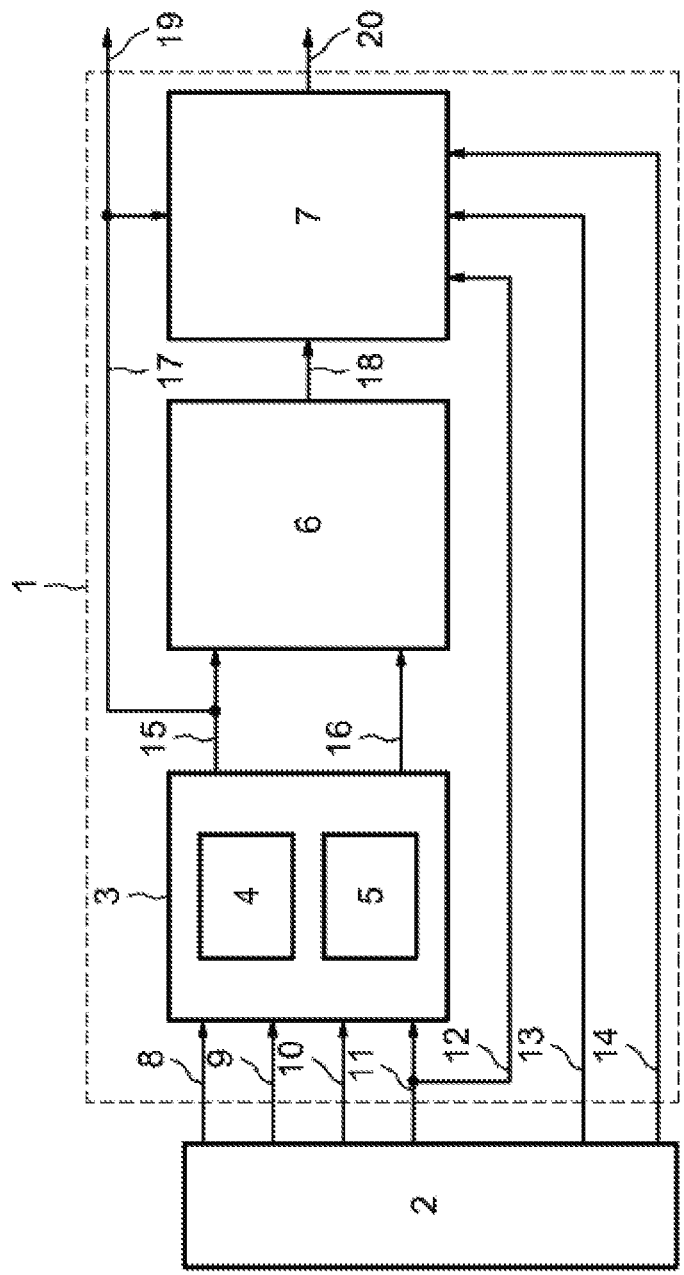

SYSTEM AND METHOD FOR CONTROLLING AN INTERNAL COMBUSTION ENGINE FOR A MOTOR VEHICLE IN TRANSIT

The invention concerns the field of sequential control of internal combustion engines with partial recirculation of the exhaust gases, and more particularly the control of such engines under transitory conditions.

Internal combustion engines are controlled by control systems developed in the factory. The systems are developed by sweeping across a plurality of discrete control magnitude values. Development thus takes place under stabilized conditions, i.e. in a phase of operation in which the control parameters do not vary.

When the vehicle is moving, however, the internal combustion engine passes through a succession of stabilized operation phases separated by transitory operation phases.

During phases of transitory operation of an internal combustion engine the internal combustion engine does not operate under conditions similar to those applying during calibration. If the system does not have time to adapt to the new operating conditions, the various control processes are ineffective. This is notably the case when changing gear or in the event of deceleration followed by acceleration.

To be able to control the operation of the internal combustion engine during these phases, it is necessary to speed up the response time of the system.

In one embodiment of the invention, there is proposed a control system for a diesel type internal combustion engine equipped with a circuit for partial recirculation of the exhaust gases, including means for estimating intake air parameter set point values. The control system includes means for estimating the exhaust richness, means for determining an intake richness set point value as a function of intake air parameter set point values, and means for correcting at least one of the intake air parameter set point values as a function of the estimate of the exhaust richness and the intake richness set point value.

The control system has the advantages of being easy to integrate into the intake air control structure of a vehicle, of using sensors generally present on a vehicle and of being capable of being adapted to all types of partial exhaust gas recirculation circuit. The control system also has the advantage of controlling phases of transitory operation of an internal combustion engine in order to speed up the response time of the system, which has the effect of reducing the emission of pollutants.

The means for determining an intake richness set point value may include a map of the volumetric efficiency and storage means containing the stoichiometric richness value, the gas constant and the cubic capacity of the internal combustion engine.

The control system may include means for measuring the temperature in the intake manifold, means for measuring the rotation speed of the engine, and means for estimating the exhaust richness. The means for correcting at least one of the intake air parameter set point values may be adapted to determine a corrected set point value for at least one of the intake air parameter set point values as a function of the estimate of the exhaust richness, the intake richness set point value, the temperature in the intake manifold, the rotation speed of the engine and the exhaust richness.

The means for estimating the exhaust richness may be a measurement sensor.

The corrected intake air flow rate set point value may correspond to the intake air flow rate set point value during stabilized operation of the internal combustion engine.

The circuit for partial recirculation of the exhaust gases may be tapped off:
 between the engine and the turbocompressor, or
 between on the one hand the turbocompressor and the cold air intake and on the other hand the turbocompressor and the exhaust, or
 a combination of those two circuits.

The means for estimating the intake air parameter set point values may be a map.

The intake air parameters may include the intake air pressure and the intake air flow rate.

In another embodiment, there is proposed a method of controlling an internal combustion engine equipping a motor vehicle, provided with a circuit for partial recirculation of the exhaust gases, the control method including estimation of intake air parameter set point values. The control method further includes the following steps:
 the exhaust richness is estimated,
 an intake richness set point value is determined as a function of the intake air parameter set point values, and
 at least one of the intake air parameter set point values is corrected as a function of the estimate of the exhaust richness and the intake richness set point value.

At least one of the intake air parameter set point values may be corrected as a function of the rotation speed of the engine, the intake temperature and the exhaust richness.

Correction of at least one of the intake air parameter set point values may leave unchanged said intake air parameter set point value during stabilized operation of the internal combustion engine.

The intake air parameters may include the intake air pressure and the intake air flow rate.

Other objects, features and advantages will become apparent on reading the following description given by way of nonlimiting example only and with reference to the appended drawing in which the single figure illustrates the principal elements of a control system in accordance with the invention.

A diesel type internal combustion engine is generally provided with a turbocompressor the compressor of which is situated between the cold air intake and the intake manifold of the engine. The turbine of the turbocompressor is situated between the exhaust manifold of the engine and the exhaust pipe. In order to control the composition of the gases aspirated into the cylinders, some internal combustion engines are provided with a circuit for partial recirculation of the exhaust gases. A circuit for partial recirculation of the exhaust gases enables reinjection of a portion of the exhaust gases into the cylinders in order to modify the stoichiometry of the intake gas mixture. A circuit for partial recirculation of the exhaust gases (known as an EGR (exhaust gas recirculation) circuit) may be situated in the low-pressure portion of the engine, i.e. on the upstream side of the compressor, or in the high-pressure portion, on the downstream side of the compressor.

A low-pressure EGR circuit is tapped off between on the one hand the compressor of the turbocompressor and the cold air intake and on the other hand the turbine of the turbocompressor and the exhaust.

A high-pressure EGR circuit is tapped off between on the one hand the compressor of the turbocompressor and the intake manifold and on the other hand the turbine of the turbocompressor and the exhaust manifold.

Finally, some internal combustion engines are provided with a low-pressure EGR circuit and a high-pressure EGR circuit.

IN BRIEF DESCRIPTION OF THE DRAWING

FIG. 1 shows the control system in accordance with the invention.

In FIG. 1 there can be seen a control system in accordance with the invention. The input of the control system 1 is connected to sensors 2. The control system 1 includes estimator means 3. The input of the estimator means 3 receives an atmospheric pressure value via the connection 8, a fuel flow rate value via the connection 9, an ambient temperature value via the connection 10 and an internal combustion engine rotation speed value via the connection 11.

The estimator means 3 output an intake air flow rate set point value via the connection 16 and an intake pressure set point value via the connection 15. The estimator means 3 include a map 5 of the intake air flow rate and a map 4 of the intake pressure.

The intake pressure set point value enables control of the rotation speed of the compressor between the low-pressure portion and the high-pressure portion of the engine.

The input of a determination means 6 receives the intake air flow rate set point value via the connection and the intake pressure set point value via the connection 15 and outputs a set point value for the composition in the intake manifold via the connection 18. The set point value for the composition in the intake manifold is also called the intake composition set point value.

The intake composition set point value $F_{isp}$ is determined by applying the following equation:

$$F_{isp} = \frac{(PCO+1) \cdot \overset{*}{m}_{f\_sp} \cdot \left(\overset{*}{m}_{in\_sp} \square \overset{*}{m}_{air\_sp}\right)}{\overset{*}{m}_{in\_sp} \cdot \left(\overset{*}{m}_{f\_sp} + \overset{*}{m}_{air\_sp}\right)} \quad \text{(Eq. 1)}$$

in which
PCO=stoichiometric richness value, 14.5 for diesel,
$\overset{*}{m}_{f\_sp}$=fuel flow rate set point value,
$\overset{*}{m}_{in\_sp}$=flow rate set point value for air aspirated by the cylinders,
$\overset{*}{m}_{air\_sp}$=air flow rate set point value.

The equation for the intake composition $F_{isp}$ has the particular feature of not involving the exhaust richness set point value.

The flow rate $\overset{*}{m}_{UB}$ of air aspirated by the cylinders is calculated by means of the standard filling equation:

$$\overset{*}{m}_{in\_sp} = \eta_{vol} \cdot \frac{Ne}{120} Vd \frac{P_{l-sp}}{R \cdot T_{11}} \quad \text{(Eq. 2)}$$

in which
$\eta_{vol}$=volumetric efficiency
Ne=engine rotation speed
Vd=cubic capacity
$P_{l-sp}$=intake pressure set point value
R=perfect gas constant
$T_{11}$=temperature downstream of the RAS In the case of an internal combustion engine provided with low-pressure partial exhaust gas recirculation it may be assumed that the intake temperature $T_i$ is equal to the temperature Tu downstream of the RAS.

The input of the correction means 7 receives the intake composition set point value via the connection 18, the intake pressure set point value via a branch connection from the connection 15, the engine rotation speed via the branch connection 12 from the connection 11, the intake temperature via the connection 13 and the exhaust richness via the connection 14. The correction means 7 output a corrected initial air flow rate set point value via the connection 20.

The correction means 7 enable determination of set point values for speeding up the response of EGR circuit control by forcing the actuator control inputs during transitory operation.

The state of the intake manifold is described by the following system of two first order differential equations:

$$\begin{cases} \overset{*}{\dot{P}}_{l\_sp} = \frac{R \cdot T_1}{V_1} \cdot \left(\overset{*}{m}_{air\_sp} + \overset{*}{m}_{egr\_sp} - \eta_{vol} \cdot \frac{Ne}{120} Vd \frac{p_{l\_sp}}{R \cdot T_{11}}\right) \\ \overset{*}{\dot{F}}_1 = \frac{R \cdot T_1}{p_{l\_sp} \cdot V_1} \cdot \left(\overset{*}{m}_{egr\_sp} \cdot (F_2 - F_1) - \overset{*}{m}_{air\_sp} \cdot F_1\right) \end{cases} \quad \text{(Eq. 3)}$$

When this system of equations is expanded and inverted, a solution of the following form is obtained:

$$\overset{*}{m}_{air\_sp,corr} = \overset{*}{m}_{T1} + \overset{*}{m}_{T2} + \overset{*}{m}_{T3} + \overset{*}{m}_{T4} \quad \text{(Eq. 4)}$$

in which
$\overset{*}{m}_{T1} = f(T_1, F_2, \dot{F}_{1\_sp}, p_{1\_sp})$
$\overset{*}{m}_{T2} = f(T_1, F_2, F_{1\_sp}, \dot{p}_{1\_sp})$
$\overset{*}{m}_{T3} = f(T_1, \dot{p}_{1\_sp})$
$\overset{*}{m}_{T4} = f(T_1, F_2, F_{1\_sp}, p_{1\_sp}, Ne)$
and $F_2$=exhaust richness measured value.

The first three terms contain the derivatives of the pressure set point value or the set point value for the composition in the intake manifold. Under stabilized conditions these terms are zero. The stationary value of the corrected set point value is then given by the fourth term.

The temperature in the intake manifold, the engine rotation speed and the richness are the principal measured values involved in the determination of the corrected set point value. The richness measured value may be replaced by an estimated value.

The control system 1 outputs the intake pressure set point value and a corrected intake air flow rate set point value.

Thus the control system enables correction of the control set point values of an internal combustion engine so as to exceed control set point values for stabilized operation and improve transitory operation. Emission of pollutants and smoke is therefore reduced during stabilized operation and during transitory operation.

The invention claimed is:

1. A control system for a diesel type internal combustion engine including a circuit for partial recirculation of exhaust gases, comprising:
   means for estimating intake air parameter set point values;
   means for estimating exhaust richness;
   means for determining an intake richness set point value as a function of the estimated intake air parameter set point values; and
   means for correcting at least one of the intake air parameter set point values as a function of the estimate of the exhaust richness and the intake richness set point value.

2. The control system as claimed in claim 1, wherein the means for determining an intake richness set point value includes a map of volumetric efficiency and storage means containing a stoichiometric richness value, a gas constant, and a cubic capacity of the internal combustion engine.

3. The control system as claimed in claim 1, further comprising:
  means for measuring temperature in an intake manifold;
  means for measuring rotation speed of the engine; and
  means for estimating the exhaust richness,
  wherein the means for correcting at least one of the intake air parameter set point values is configured to determine a corrected set point value for at least one of the intake air parameter set point values as a function of the estimate of the exhaust richness, the intake richness set point value, the temperature in the intake manifold, the rotation speed of the engine, and the exhaust richness.

4. The control system as claimed in claim 1, wherein the means for estimating the exhaust richness includes a measurement sensor.

5. The control system as claimed in claim 1, wherein the corrected intake air flow rate set point value corresponds to the intake air flow rate set point value during stabilized operation of the internal combustion engine.

6. The control system as claimed in claim 1, wherein the circuit for partial recirculation of the exhaust gases is tapped off:
  between the engine and the turbocompressor, or
  between the turbocompressor and the cold air intake and the turbocompressor and the exhaust, or
  a combination of those two circuits.

7. The control system as claimed in claim 1, wherein the means for estimating the intake air parameter set point values includes a map.

8. The control system as claimed in claim 1, wherein the intake air parameters include an intake air pressure and an intake air flow rate.

9. A method of controlling an internal combustion engine equipping a motor vehicle, including a circuit for partial recirculation of the exhaust gases, the control method estimating intake air parameter set point values, comprising: estimating exhaust richness; determining an intake richness set point value as a function of the intake air parameter set point values; and correcting at least one of the intake air parameter set point values as a function of the estimate of the exhaust richness and the intake richness set point value.

10. The method as claimed in claim 9, wherein at least one of the intake air parameter set point values is corrected as a function of rotation speed of the engine, intake temperature, and the exhaust richness.

11. The method as claimed in claim 9, wherein the correction of at least one of the intake air parameter set point values leaves unchanged the intake air parameter set point value during stabilized operation of the internal combustion engine.

12. The method as claimed in claim 9, wherein the intake air parameters include an intake air pressure and an intake air flow rate.

* * * * *